E. G. OSNESS.
SWINGLETREE HOOK.
APPLICATION FILED FEB. 27, 1917.
1,278,990.
Patented Sept. 17, 1918.
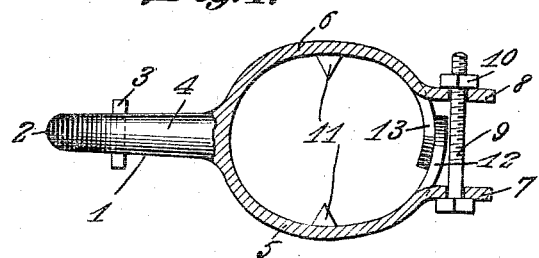
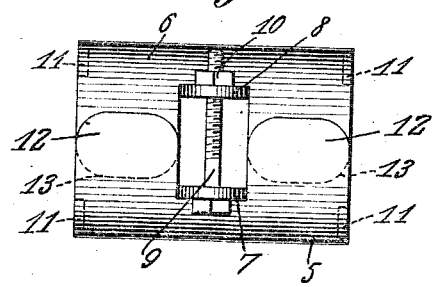
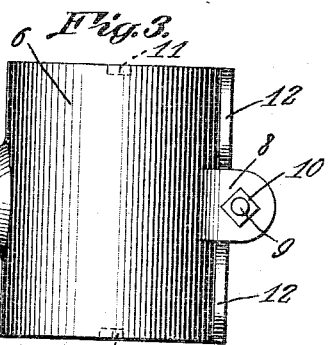
WITNESSES
John M. Dobie
Frank D. O'Connell
Edwin G. Osness INVENTOR
BY Richard B. Owen
ATTORNEY

UNITED STATES PATENT OFFICE.

EDWIN G. OSNESS, OF HUNTLEY, MONTANA.

SWINGLETREE-HOOK.

1,278,990.   Specification of Letters Patent.   Patented Sept. 17, 1918.

Application filed February 27, 1917. Serial No. 151,323.

*To all whom it may concern:*

Be it known that I, EDWIN G. OSNESS, a citizen of the United States, residing at Huntley, in the county of Yellowstone and State of Montana, have invented certain new and useful Improvements in Swingletree-Hooks, of which the following is a specification.

This invention pertains to swingle tree hooks and has for one of its main objects the provision of a hook of this character which is adjustable so that it may be attached to or detached from the swingle tree at will.

Another object is to provide a device of this character which will readily conform to the end of the swingle tree to which it is attached and which may be adjusted thereon in a manner to make up for any shrinking or contracting of the wood, whereby said hook might ordinarily become loosened.

A further object is to provide a hook of the class specified which may be cheaply manufactured and placed on the market at comparatively little expense.

With the above and other objects in view, my invention consists in the novel arrangement and combination of parts as will be hereinafter more fully referred to and described in the specification, pointed out in the claims, and illustrated in the accompanying drawings, wherein—

Figure 1 is a side view of the hook, the band portion thereof being shown in section, Fig. 2 is a rear end view, and Fig. 3 is a top plan view.

It will be seen, upon a reference to the drawings, as a whole my invention differs very little from the usual formation of swingle tree hooks, but the advantages obtained by the improved features will become apparent from the following description.

The curved shank 1 is provided with the usual form of hook end 2, across the point of which is positioned a transverse cross piece 3 which is adapted to prevent the trace hook from sliding over the end hook 2 after being fastened to the swingle tree hook. The rear end 4 of the shank is split to provide oppositely disposed branches or arms 5 and 6, each of which are of inherent resiliency and bent to extend in an arc of a circle with their free ends normally tending toward each other for over-lapping engagement as illustrated in Fig. 1 of the drawings.

The arms or bands 5 and 6 have tongue portions 7 and 8 bent outwardly from the over-lapped ends to extend in spaced vertical relation from each other as shown. Suitable adjusting means are associated with each of the outwardly turned tongues 7 and 8 for adjusting the bands 5 and 6 upon the swingle tree to which the hook is to be attached. In the present instance, a bolt 9 is shown employed for this purpose, being inserted through the lower tongue 7 with its threaded end projecting through the upper tongue 8 and being engaged by a tightening nut 10. It is evident that upon the tightening of the nut 10 the ears 7 and 8 will be caused to move in the direction of each other so that the diameter of the circle formed by the arcuate members 5 and 6 is proportionately diminished until the hook is rigidly clamped to the swingle tree to which it is attached. To enable the bands 5 and 6 to more effectively grip the end of the swingle tree and to prevent any movement of the hook in a circular plane about the swingle tree, teeth 11 are provided upon the inner faces of each of the resilient arms 5 and 6, which upon the contraction of the arms will be caused to bite or dig into the end of the swingle tree for effectively retaining the hook in engagement therewith.

The tongues 7 and 8 are positioned adjacent each other in a vertical plane, it will be seen that upon the contraction of the arms the slotted end of each band is adapted to receive the tongue of the opposite band so that movement of the ends 12 and 13 with respect to each other will be limited only when the tongues 7 and 8 are brought in contact with each other. From this it will be seen that I have provided a swingle tree hook which can be easily and readily attached to a swingle tree and which is efficient and satisfactory in its operation.

Having thus described my invention what I claim as new and desire to secure by Letters Patent is:—

1. In a swingle tree hook, the combination with a hooked shank of cuff sections adapted to embrace a swingle tree, said cuff sections having correspondingly formed notches at their opposing free ends, projections on said cuff sections adjacent the terminals of each of said notches and means associated with said projections for causing the ends of said cuff sections to be contracted laterally in the direction of each other.

2. In a swingle tree hook, the combination with a shank having a hooked end of cuff sections formed on said shank and adapted to embrace a swingle tree, the free ends of said cuff sections being adapted to move laterally of each other and provided with notches therein, tongue members carried by each of said free ends, and adapted for movement in each of the notches in the opposite end, and means engaging said tongues for contracting the free ends of said cuff sections about the swingle tree.

3. In a swingle tree hook, the combination with a shank having a hooked end, of a pair of resilient cuff sections formed on said shank and having their ends overlapping each other, said cuff sections having tongue portions bent outwardly from their free ends, thus forming notches in the center thereof each adapted to receive the tongue of the opposite cuff section, said cuff sections having their inner faces provided with teeth which prevent lateral movement of the hook, and means for causing the said tongue portions to be contracted laterally in the direction of each other.

In testimony whereof I affix my signature in presence of two witnesses.

EDWIN G. OSNESS.

Witnesses:
ERIC MANSTEDT,
H. L. OSNESS.

Copies of this patent may be obtained for five cents each, by addressing the "Commissioner of Patents, Washington, D. C."